US009094905B2

(12) United States Patent
Bai et al.

(10) Patent No.: US 9,094,905 B2
(45) Date of Patent: Jul. 28, 2015

(54) METHOD, APPARATUS AND COMPUTER PROGRAM PRODUCT FOR TRIGGERING THE DETERMINATION OF A TIMING ADVANCE FOR ONE COMPONENT CARRIER BASED UPON ANOTHER COMPONENT CARRIER

(75) Inventors: Wei Bai, Beijing (CN); David Randall, Romsey Hampshire (GB); Erlin Zeng, Beijing (CN); Jing Han, Beijing (CN); Haiming Wang, Beijing (CN)

(73) Assignee: BROADCOM CORPORATION, Irvine, CA (US)

( * ) Notice: Subject to any disclaimer, the term of this patent is extended or adjusted under 35 U.S.C. 154(b) by 44 days.

(21) Appl. No.: 14/007,996

(22) PCT Filed: Apr. 2, 2011

(86) PCT No.: PCT/CN2011/072419
§ 371 (c)(1),
(2), (4) Date: Sep. 27, 2013

(87) PCT Pub. No.: WO2012/135992
PCT Pub. Date: Oct. 11, 2012

(65) Prior Publication Data
US 2014/0016623 A1 Jan. 16, 2014

(51) Int. Cl.
*H04W 56/00* (2009.01)
*H04L 5/00* (2006.01)

(52) U.S. Cl.
CPC ........... *H04W 56/0005* (2013.01); *H04L 5/001* (2013.01); *H04W 56/0045* (2013.01)

(58) Field of Classification Search
CPC ................... H04W 56/0005; H04W 56/0045; H04L 5/001
See application file for complete search history.

(56) References Cited

U.S. PATENT DOCUMENTS

2011/0170535 A1* 7/2011 Wang et al. .................... 370/350
2011/0200032 A1* 8/2011 Lindstrom et al. ............ 370/350
(Continued)

FOREIGN PATENT DOCUMENTS

| CN | 101646234 A | 2/2010 |
| CN | 101888648 A | 11/2010 |
| WO | WO-2012/103683 | 9/2012 |

OTHER PUBLICATIONS

International Search Report and Written Opinion for Application No. PCT/CN2011/072419, dated Jan. 5, 2012.
(Continued)

*Primary Examiner* — Clemence Han
(74) *Attorney, Agent, or Firm* — Oblon, McClelland, Maier & Neustadt, L.L.P.

(57) ABSTRACT

A method, apparatus and computer program product are provided to facilitate the determination of the timing advances of each of a plurality of component carriers by triggering the determination of the timing advances in response to certain pre-defined events that are indicative of a need for the timing advance to be determined. A method may include determining that a pre-defined event has occurred and triggering a determination of a timing advance for a second component carrier relative to a timing advance of a first component carrier based upon occurrence of the predefined event. In this regard, both the component carriers are concurrently allocated to a mobile terminal. The method may also utilize the timing advance to synchronize communications on the second component carrier between the mobile terminal and a network. A corresponding apparatus and computer program product may also be provided.

18 Claims, 7 Drawing Sheets

(56) References Cited

U.S. PATENT DOCUMENTS

| | | | |
|---|---|---|---|
| 2011/0249635 A1* | 10/2011 | Chen et al. | 370/329 |
| 2012/0063302 A1* | 3/2012 | Damnjanovic et al. | 370/228 |
| 2012/0063425 A1 | 3/2012 | Wang et al. | |
| 2012/0099577 A1* | 4/2012 | Baldemair et al. | 370/338 |
| 2012/0282969 A1* | 11/2012 | Jiang et al. | 455/517 |
| 2013/0003682 A1* | 1/2013 | Jiang et al. | 370/329 |
| 2013/0021979 A1* | 1/2013 | Kwon et al. | 370/328 |
| 2013/0034069 A1* | 2/2013 | Uemura | 370/329 |
| 2013/0058315 A1* | 3/2013 | Feuersanger et al. | 370/336 |
| 2013/0315214 A1* | 11/2013 | Bai et al. | 370/336 |
| 2014/0369322 A1* | 12/2014 | Fwu et al. | 370/336 |

OTHER PUBLICATIONS (3GPP) TS 36.211 v10.0.0 (Dec. 2010); 3$^{rd}$ Generation Partnership Project; Technical Specification Group Radio Access Network Evolved Universal Terrestrial Radio Access (E-UTRA); Physical Channels and Modulation (Release 10).

* cited by examiner

US 9,094,905 B2

METHOD, APPARATUS AND COMPUTER PROGRAM PRODUCT FOR TRIGGERING THE DETERMINATION OF A TIMING ADVANCE FOR ONE COMPONENT CARRIER BASED UPON ANOTHER COMPONENT CARRIER

TECHNOLOGICAL FIELD

Embodiments of the present invention relate generally to methods and apparatus for determining a timing advance of a component carrier and, more particularly, to a method, apparatus and computer program product for triggering the determination of a timing advance for one component carrier based upon another component carrier.

BACKGROUND

From the perspective of a base station, such as an evolved node B (eNB) in an evolved universal terrestrial radio access network (E-UTRAN) system, the signals from all the mobile terminals should arrive at the same time. The E-UTRAN system enables this by using a timing advance (TA) to control timing of the uplink (UL) transmissions from the mobile terminals. This TA also compensates for delay in the signal propagating from the sending mobile terminal to the receiving base station. Specifically, third generation partnership project (3GPP) TS 36.211 v10.0.0 (2010-12) from which FIG. 1 is taken sets forth that transmission of the uplink radio frame number i from the mobile station shall start $(N_{TA} + N_{TA\ offset}) \times T_s$ seconds before the start of the corresponding downlink radio frame at the mobile terminal, where $0 \leq N_{TA} \leq 20512$, $N_{TA\ offset} = 0$ for frame structure type 1 and $N_{TA\ offset} = 624$ for frame structure type 2. Note that not all slots in a radio frame may be transmitted; for example in the time division duplex (TDD) mode only a subset of the slots in a radio frame are transmitted.

The UL and the downlink (DL) transmissions between the same base station (or radio head/repeater/relay) and the mobile terminal have the same propagation path and speed. So from the point of view of the base station, the base station will control the time at which it receives the UL transmission so as to align with the DL transmission timing. Therefore, the timing difference between a DL transmission sent by the base station and an UL transmission sent by the mobile terminal should be the same as the difference between the DL reception at the mobile terminal and DL transmission from the base station. This relationship is shown graphically at FIG. 2, where the timing values refer to the time at which the relevant transmission is sent or received. The difference $[T_{UT} - T_{DT}]$ between the time $T_{DT}$ at which the base station sends the DL transmission and the time $T_{UT}$ at which the mobile terminal sends its UL transmission is the same as the difference $[T_{DT} - T_{DR}]$ between the time $T_{DT}$ and the time $T_{DR}$ at which mobile terminal receives the DL transmission from the base station. The timing advance is the round trip time, and equation (1) below expresses the TA and the equivalence of the timing differences explained above.

$$TA = T_{DR} - T_{UT}$$

$$T_{DT} - T_{UT} = T_{DR} - T_{DT} \quad (1)$$

From equation (1), it follows that $TA = 2*(T_{DR} - T_{DT})$.

The utilization of TA to synchronize the receipt of UL transmissions by a base station may be more complex in a system that employs carrier aggregation (CA). In this regard, wireless systems, such as the Long Term Evolution (LTE)-Advanced wireless system, aims to provide enhanced services by means of higher data rates and lower latency with reduced cost. CA is one technology that LTE-Advanced systems intend to employ for improving the data rate. FIG. 3 illustrates the CA concept. As shown, the entire bandwidth of the wireless system is divided into two or more component carriers (CCs), of which FIG. 3 shows five CCs by example. At least one CC is configured to serve legacy mobile terminals. Release 10 and later mobile terminals are to be capable of monitoring/using multiple CCs, and so the wireless network is able to assign two or more CCs simultaneously as active for a single mobile terminal. This enables the network greater scheduling flexibility by giving it the ability to allocate channels to the same mobile terminal on any one or more of the multiple CCs assigned to a given mobile terminal. In the case multiple CCs are assigned and active for a mobile terminal, one of the assigned CCs will be the mobile terminal's primary CC and the other(s) will be secondary CC(s). The mobile terminal's secondary CC(s) is/are also sometimes termed an extension carrier.

For Release 10, 3GPP has agreed that there will be only intra-band CA for the UL and one TA for all the UL CCs. But in Release 11 and beyond, when taking inter-band CA into deployment, as well as the cases of radio remote head (RRH) and repeaters (which are conceptually similar to relay stations for the purposes herein), multiple TAs will be necessary.

When CA is introduced, it may be that not all CCs assigned for the mobile terminal are on the same timing, and so the TA on one CC is not valid for another CC on which the mobile terminal is communicating simultaneously. In this case the mobile terminal will need to adjust the UL transmission timing on the second CC in order to assure its UL transmissions are synchronized for the base station (or other reception node such as a repeater).

If one of the CCs is termed the mobile terminal's primary cell (PCell), and the other asynchronous CC is termed the mobile terminal's secondary cell (SCell), then the timing relation shown by example at FIG. 4 graphically illustrates the multiple timing advances. Note that in FIG. 4, the UL and DL radio frames on the mobile terminal's PCell are the same as those shown in FIG. 2; but FIG. 4 shows also the similar radio frames transmitted on the mobile terminal's SCell which are asynchronous with those on the PCell.

The TA for each of the CCs may be determined in various manners. By way of background, for Releases 8/9/10, the only way for a mobile terminal which was not yet synchronized with a serving base station to measure the timing advance was by accessing the random access channel (RACH). For Release 10, it was also agreed that random access will only be performed on the mobile terminal's primary CC, and so the mobile terminal was not required to know the RACH configuration on any secondary CCs.

For Release 11 and beyond, when multiple TAs are introduced, a mobile terminal also had to determine the TA value for its SCell(s). Simply requiring the mobile terminal to utilize the RACH procedure to learn the TA on an SCell would require that the RACH configuration on the SCell be indicated to the UE somehow, and also this would lead to some changes to the current SCell parameter structure.

Additionally, in Release 10, RACH failure is recognized as a trigger condition for radio link failure (RLF). This followed from RACH being performed only on the PCell, but if the mobile terminal hypothetically also had RACH access on the SCell, there would be a need for further standardization as to what would be a trigger to indicate UL RLF. These more nuanced issues are in addition to the straightforward ones, such as if the mobile terminal is to get the SCell TA on an SCell RACH, there would necessarily be an increase to RACH overhead, meaning a higher load on the SCell RACH due to a higher number of mobile terminals accessing it and also greater potential for delay on the RACH since more mobile terminals would be competing for a slot on it.

As described in International Patent Application No. PCT/CN2011/070874 filed on Feb. 1, 2011 entitled Timing Advance Without Random Access Channel Access, the contents of which are incorporated herein by reference, a mobile terminal may determine the TA of a secondary cell based upon the timing difference between the primary cell and the secondary cell. By determining the TA of a secondary cell based upon the timing difference between the secondary cell and the primary cell, the TA of the secondary cell may be determined without access to the RACH of the secondary cell and without the issues potentially created by access to the RACH of the secondary cell.

In conjunction with the establishment of a TA for any of the CCs, a timer may be maintained which defines the period of time during which the TA remains valid for the respective CC. With CA and the establishment of different TAs for a number of CCs, however, the mobile terminal may have to establish and maintain timers for the TAs of each of the CCs, which may become more complex with the multiplicity of CCs.

BRIEF SUMMARY

A method, apparatus and computer program product are therefore provided to facilitate the determination of the timing advances of each of a plurality of component carriers by triggering the determination of the timing advances in response to certain predefined events that are indicative of a need for the timing advance to be determined. The method, apparatus and computer program product of one embodiment may therefore insure that the uplink transmissions on the various component earners are properly synchronized with the base station by utilizing the respective timing advances. Additionally, the method, apparatus and computer program product of one embodiment may set the timer that defines the period of time during which a timing advance of a component carrier is valid in a manner that takes into account relationships between the timing advances of two or more component carriers.

In one embodiment, a method is provided that includes determining that a predefined event has occurred and triggering a determination of a timing advance for a second component carrier relative to a timing advance of a first component carrier based upon occurrence of the predefined event. In this regard, both the component carriers are concurrently allocated to a mobile terminal. The method of this embodiment also utilizes the timing advance to synchronize communications on the second component carrier between the mobile terminal and a network.

The determination that the predefined event has occurred may be accomplished in various different manners. In an instance in which the second component carrier is deactivated, the method may determine that the predefined event has occurred in an instance in which an activation command to activate the second component carrier is received. In an instance in which the second component carrier lacks a valid timing advance, the method may determine that a predefined event has occurred in an instance in which signaling is received indicating an uplink grant reception. As another example, the method may determine that a predefined event has occurred by determining that a timing advance for the first component carrier has been adjusted. In an instance in which the first and second component carriers are primary and secondary component carriers, respectively, the method may determine that a predefined event has occurred by determining that the timing advance of the secondary component carrier is determined by accessing a random access channel (RACH) such that the timing advance of the primary component carrier may be determined based upon the timing advance of the secondary component carrier. As a further example, the method may determine that the predefined event has occurred by receiving a signal from the network indicating that the timing advance for the second component carrier is to be determined. The method of one embodiment may also determine a time alignment timer that defines a time period during which the timing advance will be valid for the second component carrier. In this embodiment, determining the time alignment timer may include setting the time alignment timer equal to a residual time during which the timing advance of the first component carrier will remain valid.

In another embodiment, an apparatus is provided that includes a processing circuitry configured to determine that a predefined event has occurred and to trigger a determination of a timing advance for a second component carrier relative to a timing advance of a first component carrier based upon occurrence of the predefined event. In this regard, both the component carriers are concurrently allocated to a mobile terminal. The processing circuitry of this embodiment is also configured to utilize the timing advance to synchronize communications on the second component carrier between the mobile terminal and a network.

In an instance in which the second component carrier is deactivated, the processing circuitry may be configured to determine that the predefined event has occurred in an instance in which an activation command to activate the second component carrier is received. In an instance in which the second component carrier lacks a valid timing advance, the processing circuitry may be configured to determine that a predefined event has occurred in an instance in which signaling is received indicating an uplink grant reception. As another example, the processing circuitry may determine that a predefined event has occurred by determining that a timing advance for the first component carrier has been adjusted. In an instance in which the first and second component carriers are primary and secondary component carriers, respectively, the processing circuitry may be configured to determine that a predefined event has occurred by determining that the timing advance of the secondary component carrier is determined by accessing a random access channel (RACH) such that the timing advance of the primary component carrier may be determined based upon the timing advance of the secondary component carrier. As a further example, the processing circuitry may be configured to determine that the predefined event has occurred by receiving a signal from the network indicating that the timing advance for the second component carrier is to be determined. The processing circuitry of one embodiment may also be configured to determine a time alignment timer that defines a time period during which the timing advance will be valid for the second component carrier. In this embodiment, the processing circuitry may be configured to determine the time alignment timer by setting the time alignment timer equal to a residual time during which the timing advance of the first component carrier will remain valid.

In a further embodiment, a computer program product is provided that includes at least one non-transitory computer-readable storage medium having computer-readable program instructions stored therein. The computer-readable program instructions include program instructions configured to determine that a predefined event has occurred and to trigger a determination of a timing advance for a second component carrier relative to a timing advance of a first component carrier based upon occurrence of the predefined event. In this regard, both the component carriers are concurrently allocated to a mobile terminal. The computer-readable program instructions of this embodiment may also include program instructions configured to utilize the timing advance to synchronize communications on the second component carrier between the mobile terminal and a network.

In an instance in which the second component carrier is deactivated, the program instructions may be configured to determine that the predefined event has occurred in an instance in which an activation command to activate the second component carrier is received. In an instance in which the second component carrier lacks a valid timing advance, the program instructions may be configured to determine that a predefined event has occurred in an instance in which signaling is received indicating an uplink grant reception. As another example, the program instructions may be configured to determine that a predefined event has occurred by determining that a timing advance for the first component carrier has been adjusted. In an instance in which the first and second component carriers are primary and secondary component carriers, respectively, the program instructions may be configured to determine that a predefined event has occurred by determining that the timing advance of the secondary component carrier is determined by accessing a random access channel (RACH) such that the timing advance of the primary component carrier may be determined based upon the timing advance of the secondary component carrier. As a further example, the program instructions may be configured to determine that the predefined event has occurred by receiving a signal from the network indicating that the timing advance for the second component carrier is to be determined. The computer-readable program instructions of one embodiment may also include program instructions configured to determine a time alignment timer that defines a time period during which the timing advance will be valid for the second component carrier. In this embodiment, the program instructions configured to determine the time alignment timer may include program instructions configured to set the time alignment timer equal to a residual time during which the timing advance of the first component carrier will remain valid.

In yet another embodiment, an apparatus is provided that includes means for determining that a predefined event has occurred and means for triggering a determination of a timing advance for a second component carrier relative to a timing advance of a first component carrier based upon occurrence of the predefined event. In this regard, both the component carriers are concurrently allocated to a mobile terminal. The apparatus of this embodiment also includes means for utilizing the timing advance to synchronize communications on the second component carrier between the mobile terminal and a network.

In an instance in which the second component carrier is deactivated, the apparatus may include means for determining that the predefined event has occurred in an instance in which an activation command to activate the second component carrier is received. In an instance in which the second component carrier lacks a valid timing advance, the apparatus may include means for determining that a predefined event has occurred in an instance in which signaling is received indicating an uplink grant reception. As another example, the means for determining that a predefined event has occurred may include means for determining that a timing advance for the first component carrier has been adjusted. In an instance in which the first and second component carriers are primary and secondary component carriers, respectively, the means for determining that a predefined event has occurred may include means for determining that the timing advance of the secondary component carrier is determined by accessing a random access channel (RACH) such that the timing advance of the primary component carrier may be determined based upon the timing advance of the secondary component carrier. As a further example, the means for determining that the predefined event has occurred may include means for receiving a signal from the network indicating that the timing advance for the second component carrier is to be determined. The apparatus of one embodiment may also include means for determining a time alignment timer that defines a time period during which the timing advance will be valid for the second component carrier. In this embodiment, the means for determining the time alignment timer may include means for setting the time alignment timer equal to a residual time during which the timing advance of the first component carrier will remain valid.

BRIEF DESCRIPTION OF THE SEVERAL VIEWS OF THE DRAWINGS

Figure 1:
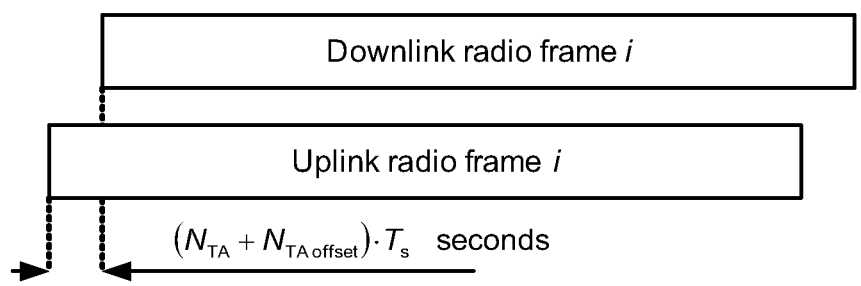
Figure 2:
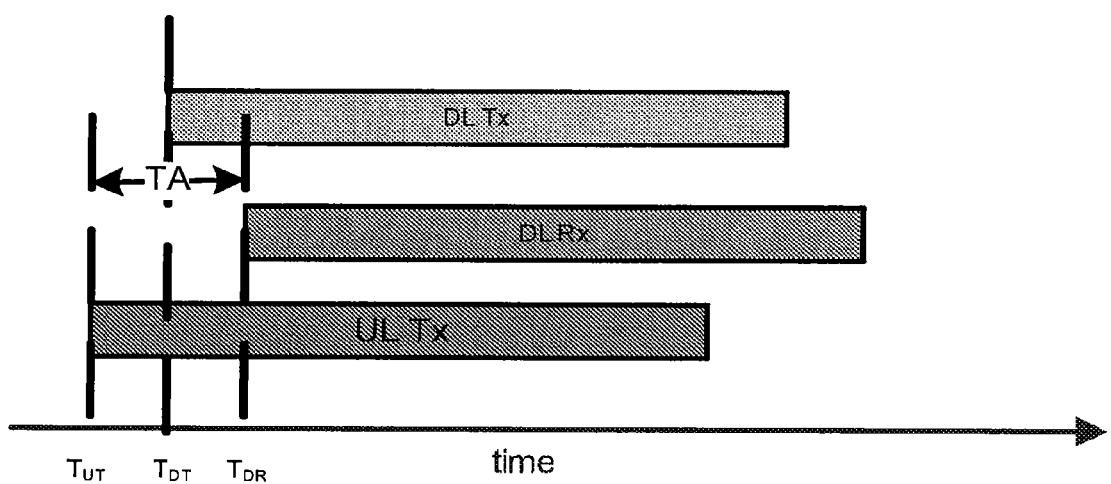
Figure 3:
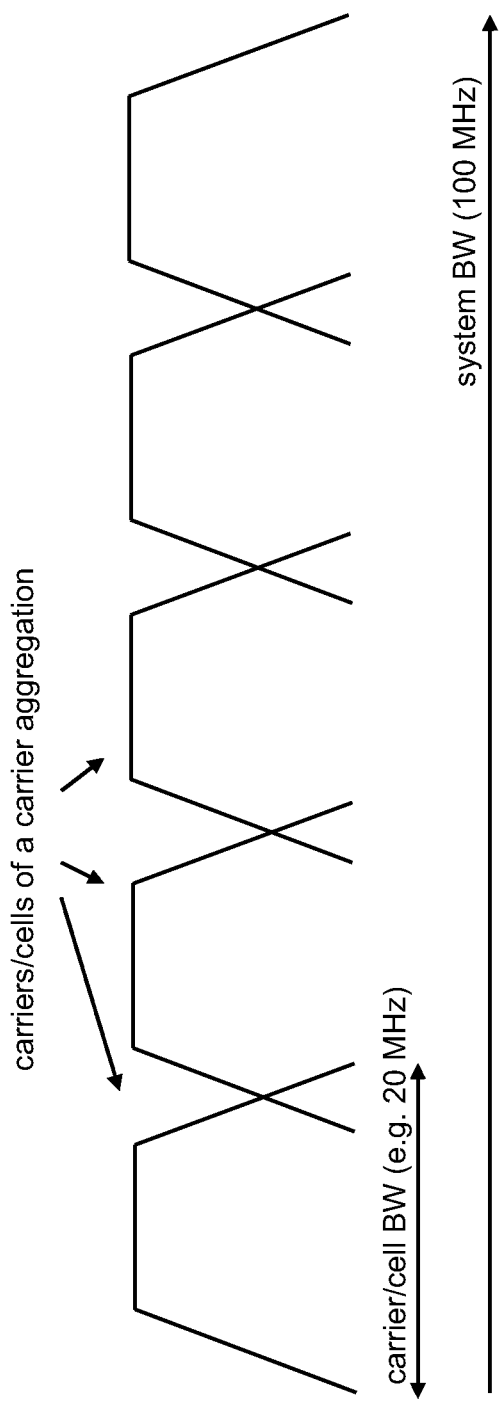
Figure 4:
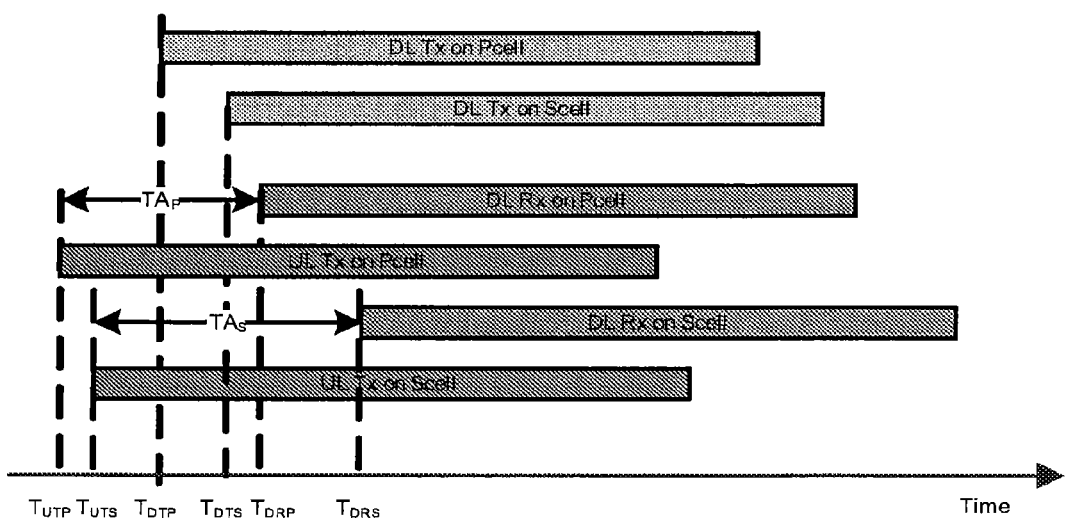
Figure 5:
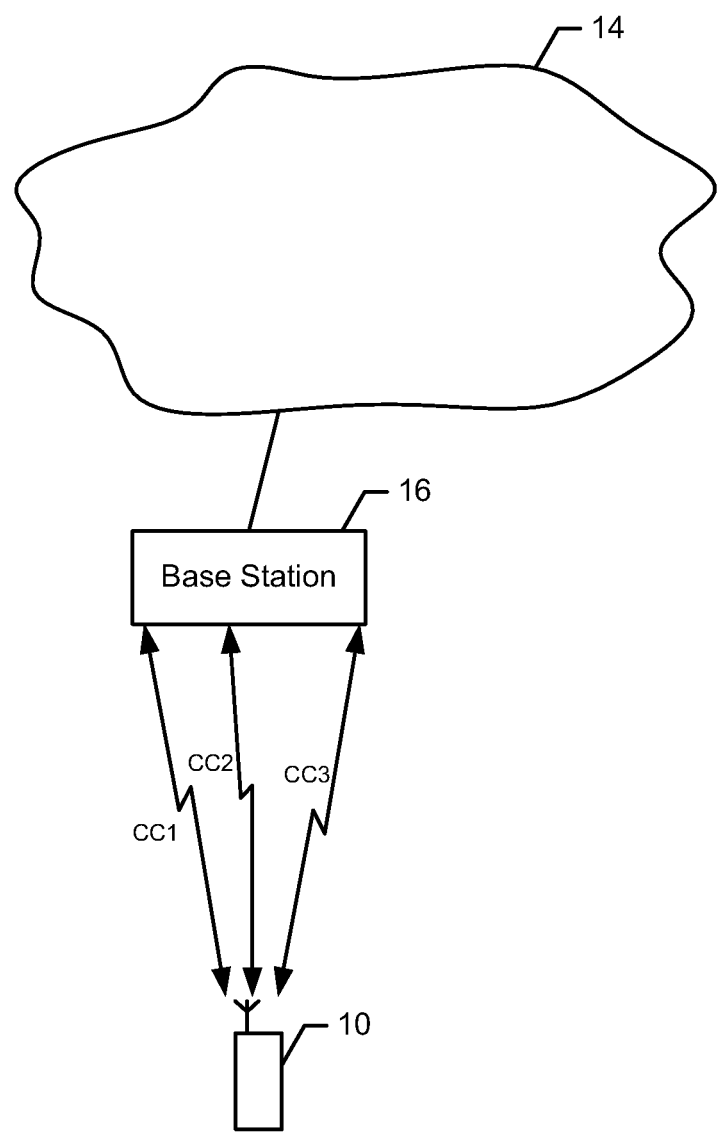
Figure 6:
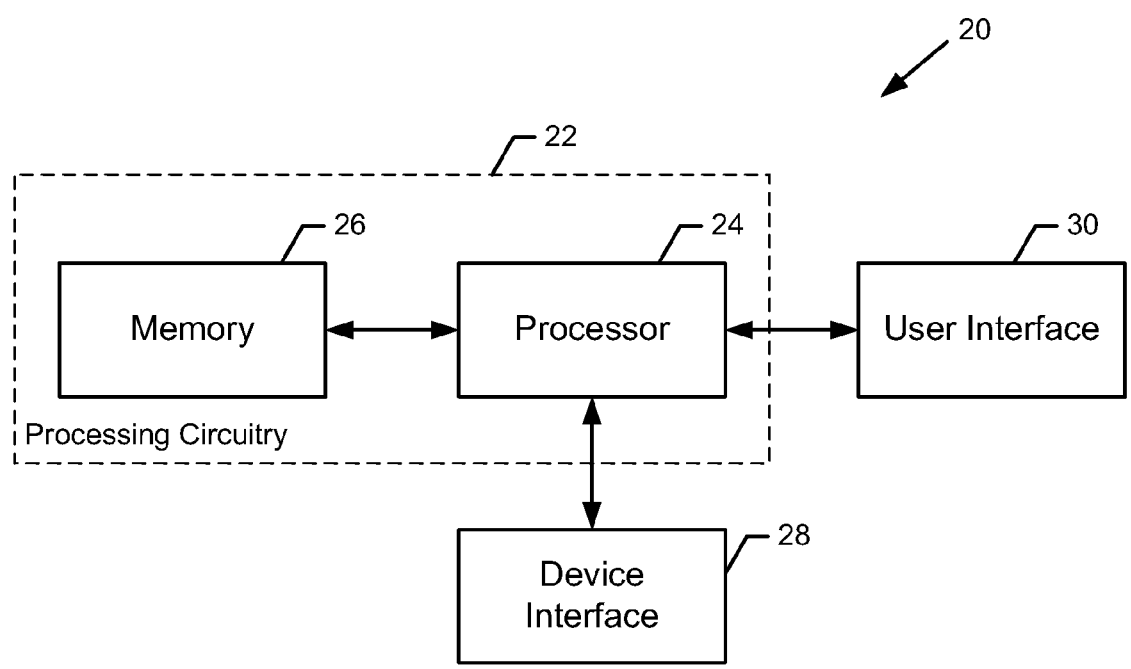
Figure 7:
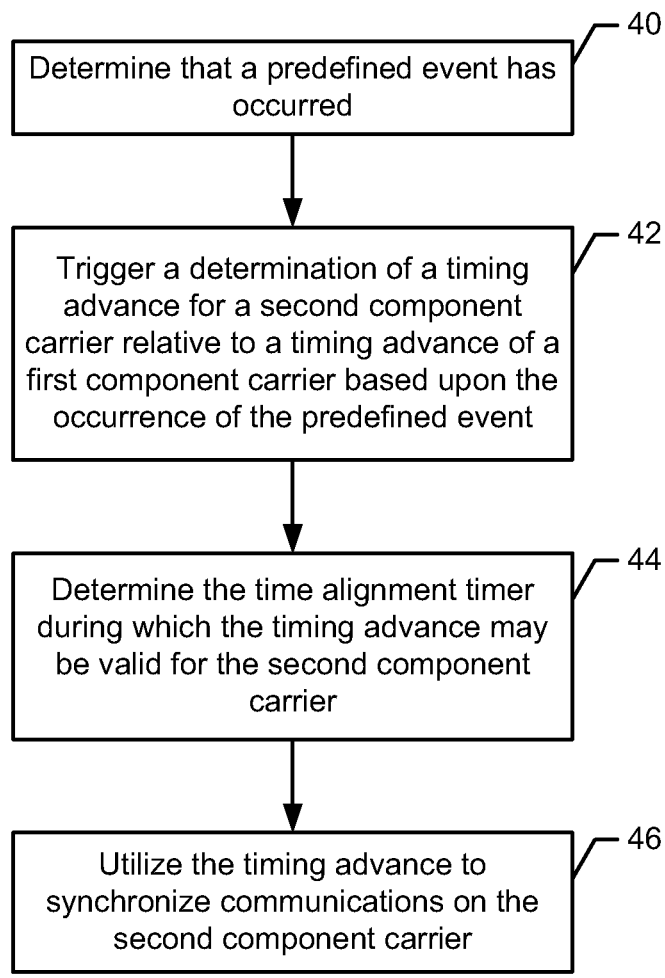

Having thus described embodiments of the invention in general terms, reference will now be made to the accompanying drawings, which are not necessarily drawn to scale, and wherein:

FIG. 1 shows Prior Art;

FIG. 2 is a signaling diagram showing timing relation between various uplink and downlink messages;

FIG. 3 is a schematic diagram illustrating a wireless system utilizing carrier aggregation, in which there are five component carriers or cells shown for which a mobile terminal might be allocated multiple component carriers/cells simultaneously;

FIG. 4 is a signaling diagram similar to FIG. 2, but showing the timing relations for the messages on a primary and a secondary cell;

FIG. 5 is a block diagram of a communications system in accordance with one embodiment of the present invention;

FIG. 6 is a block diagram of an apparatus in accordance with one embodiment of the present invention; and FIG. 7 is a flow chart illustrating operations performed in accordance with one embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A method, apparatus and computer program product are provided for triggering the determination of a timing advance of a second component carrier, such as a secondary cell, relative to the timing advance of a first component carrier based upon the occurrence of a predefined event. Based upon the determination of the timing advance, a mobile terminal may advantageously synchronize communications between the mobile terminal and the network on the component carrier. Although the method, apparatus and computer program product may be implemented in a variety of different systems, one example of such a system is shown in FIG. 5, which includes a first communication device (e.g., mobile terminal 10) that is capable of communication with a network 14 (e.g., a core network). While the network may be configured in accordance with LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (CPRS) and/or the like.

The network 14 may include a collection of various different nodes, devices or functions that may be in communication with each other via corresponding wired and/or wireless interfaces. For example, the network may include one or more base stations 16, such as one or more node Bs, evolved node Bs (eNBs), access points or the like, each of which may serve a coverage area divided into one or more cells. The base station or other communication node could be, for example, part of one or more cellular or mobile networks or public land mobile networks (PLMNs). In turn, other devices such as processing devices (e.g., personal computers, server computers or the like) may be coupled to the mobile terminal and/or the second communication device via the network.

A communication device, such as the mobile terminal 10, may be in communication with other communication devices or other devices via the network 14. In some cases, each of the communication devices may include an antenna for transmitting signals to and for receiving signals from a base station 16 via a plurality of CCs including a primary cell (Pcell) and one or a more secondary cells (Scell). Some of the secondary cells may be deactivated during various periods of time to conserve power. As described below, the method, apparatus and computer program product of embodiments of the present invention may trigger a determination of a timing advance of a component carrier, such as a secondary cell, based upon the occurrence of a predefined event such that subsequent communications between the mobile terminal and the network on the respective component carrier may be synchronized.

In some example embodiments, the mobile terminal 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal may include one or more processors that may define processing circuitry either alone or in combination with one or more memories. The processing circuitry may utilize instructions stored in the memory to cause the mobile terminal to operate in a particular way or execute specific functionality when the instructions are executed by the one or more processors. The mobile terminal may also include communication circuitry and corresponding hardware/software to enable communication with other devices and/or the network 14.

In one embodiment, for example, the mobile terminal 10 and the base station 16 may be embodied as or otherwise include an apparatus 20 as generically represented by the block diagram of FIG. 6. In the context of a mobile terminal, the apparatus may be configured to trigger a determination of a timing advance of a component carrier, such as a secondary cell, based upon the occurrence of a predefined event, while in the context of a base station, the apparatus may be configured to cause the predefined event which, in turn, triggers the determination of the timing advance of a component carrier. While the apparatus may be employed, for example, by a mobile terminal or a base station, it should be noted that the components, devices or elements described below may not be mandatory and thus some may be omitted in certain embodiments. Additionally, some embodiments may include further or different components, devices or elements beyond those shown and described herein.

As shown in FIG. 6, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 26 that may be in communication with or otherwise control a device interface 28 and, in some cases, a user interface 30. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal 10, the processing circuitry may be embodied as a portion of a mobile computing device or other mobile terminal.

The user interface 30 (if implemented) may be in communication with the processing circuitry 22 to receive an indication of a user input at the user interface and/or to provide an audible, visual, mechanical or other output to the user. As such, the user interface in the context of a mobile terminal 10 may include, for example, a keyboard, a mouse, a joystick, a display, a touch screen, a microphone, a speaker, and/or other input/output mechanisms. In the context of a base station, however, the user interface may be limited or eliminated.

The device interface 28 may include one or more interface mechanisms for enabling communication with other devices and/or networks. In some cases, the device interface may be any means such as a device or circuitry embodied in either hardware, or a combination of hardware and software that is configured to receive and/or transmit data from/to a network 14 and/or any other device or module in communication with the processing circuitry 22. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Referring now to FIG. 7, a flowchart illustrating the operations performed by a method, apparatus and computer program product, such as apparatus 20 of FIG. 6, in accordance with one embodiment of the present invention are illustrated. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 7, when executed, convert a computer or processing circuitry into a particular machine configured to perform an example embodiment of the present invention. Accordingly, the operations of FIG. 7 define an algorithm for configuring a computer or processing circuitry, e.g., processor 24, to perform an example embodiment. In some cases, a general purpose computer may be provided with an instance of the processor which performs the algorithm of FIG. 7 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

As shown in FIG. 5, the mobile terminal 10 may be in communication with the network 14 via a base station 16. In accordance with an example embodiment, the mobile terminal may support carrier aggregation such that the base station and the mobile terminal are configured to communicate via a plurality of component carriers or cells, each of which operate at a different frequency, thereby providing a greater bandwidth for the mobile terminal. As shown in FIG. 5, one of the carriers, such as CC1, is designated as a primary cell, while the other carriers are designated as secondary cells, such as CC2, CC3, etc.

In accordance with an example embodiment of the present invention, a determination may be made as to when it is appropriate to trigger the determination of a timing advance for a second component carrier relative to the timing advance of a first component carrier. In this regard, the timing advance of the second component carrier, such as a secondary cell, is based upon the difference between the timing advance of the second component carrier and the timing advance of the first component carrier, such as the primary cell. The embodiments of the method, apparatus and computer program product may define various predefined events that may trigger the determination of the timing advance of a secondary component carrier with the predefined events selected such that a timing advance will have been determined in advance for most, if not all, of the instances in which an UL transmission is to be made on the second component carrier. As such, the mobile terminal 10 may include means, such as the processing circuitry 22, the processor or the like, for determining that a predefined event has occurred, as shown in block 40 of FIG. 7.

In one embodiment in which the second component carrier, such as a secondary cell, has been deactivated in order to conserve power, for example, the mobile terminal 10 may include means, such as the processing circuitry 22, the processor 24 or the like, for receiving an activation command from the base station 16 that requests that the second component carrier be activated. Thus, the receipt of the activation command serves as the predefined event in this embodiment. In this embodiment, the subsequent UL transmission from the mobile terminal to the base station may be for the purpose of activation. As such, the mobile terminal, such as the processing circuitry, the processor or the like, may determine the timing advance of the second component carrier in order to prepare for the impending UL transmission.

In another embodiment in which the timer that defines the period of time during which a timing advance of a component carrier is valid has expired for a particular component carrier, such as a secondary cell, the mobile terminal 10 may release the sounding reference signal (SRS) on the respective component carrier and cease any uplink transmissions on the second component carrier. If, however, the base station 16 wants to subsequently schedule an uplink transmission on the secondary cell and the primary cell has a valid timing advance, the mobile terminal, such as the processing circuitry 22, the processor 24 or the like, may determine the timing advance of the secondary cell based upon the timing advance of the primary cell. As such, in this embodiment, the mobile terminal may include means, such as the processing circuitry, the processor or the like, for determining that a predefined event has occurred as a result of the receipt of an uplink grant on a secondary cell, which does not have a valid timing advance.

In another embodiment, the mobile terminal 10 may include means, such as the processing circuitry 22, the processor 24 or the like, for receiving a timing advance command from the base station 16, such as within a medium access control (MAC) control element (CE), that instructs that the timing advance of the primary cell be adjusted. In one embodiment, the MAC CE includes eight bits of which five bits are reserved and three bits are utilized to provide a cell index which identifies the component carrier of interest, such as the primary cell in this embodiment. The command to adjust the timing advance of the primary cell may be determined by the mobile terminal, such as the processing circuitry, the processor or the like, to be the predefined event since the timing advance of the secondary cell is determined based upon the timing advance of the primary cell such that any adjustment of the timing advance of the primary cell should lead to the refinement or other recalculation of the timing advance of the secondary cell.

There have also been proposals to allow access to the RACH by a secondary cell so as to, for example, balance the RACH load across the various component carriers or cells. By way of example, in Release 10, the 3GPP makes a proposal to allow RACH on a secondary cell. In this embodiment, a mobile terminal 10 may be configured with carrier aggregation, but may not have a valid timing advance for any of the component carriers. In an instance in which a secondary cell is selected to perform RACH, the secondary cell may determine the timing advance of the secondary cell by its access to the RACH. In this embodiment, the mobile terminal may include means, such as the processing circuitry 22, the processor 24 or the like, for determining that the RACH access by the secondary cell in an instance in which none of the component carriers has a valid timing advance is the predetermined event and may then determine the timing advance of the primary cell based upon the timing advance of the secondary cell. Thus, while the method, apparatus and computer program products of some embodiments of the present invention trigger the determination of the timing advance of a secondary cell based upon the timing advance of a primary cell, the method, apparatus and computer program product of this embodiment may trigger the determination of the timing advance of the primary cell based upon the timing advance of the secondary cell.

In yet another embodiment, the mobile terminal 10 may include means, such as the processing circuitry 22, the processor 24 or the like, for receiving a signal from the network 14, such as from the base station 16, that triggers the timing advance determination. Thus, the receipt of the triggering signal from the network may also serve as a predefined event. In this instance, the signals received by the mobile terminal may include various downlink signals including L1 signaling, such as packet data control channel (PDCCH), MAC CE or radio resource control (RRC) signaling.

As shown in block 42 of FIG. 7, the mobile terminal 10 may include means, such as the processing circuitry 22, the processor 24 or the like, for triggering a determination of a timing advance for a second component carrier relative to the timing advance of a first component carrier based upon, e.g., in response to, the occurrence of the predefined event. In this regard, the timing advance of a second component carrier may be determined based upon and relative to the timing advance of a first component carrier, such as based upon the difference between the respective timing advances of the first and second component carriers, in various manners, but, in one embodiment, may be determined as described by International Application No. PCT/CN 2011/070874, the contents of which have been expressly incorporated herein by reference. The mobile terminal may also include means, such as the processing circuitry, the processor or the like, for utilizing the timing advance to synchronize communications on the second component carrier between the mobile terminal and the network. See block 46 of FIG. 7. In this regard, the mobile terminal, such as the processing circuitry, the processor or the like, may synchronize uplink transmissions from the mobile terminal to the base station in accordance with the timing advance of the second component carrier.

In one embodiment shown, for example, in block 44 of FIG. 7, the mobile terminal 10 may also optionally include means, such as the processing circuitry 22, the processor 24 or the like, for determining a time alignment timer. The time alignment timer defines a time period during which the timing advance will be valid for a respective second component carrier. In conjunction with the determination of the timing advance of the second component carrier based upon and relative to the timing advance of a first component carrier, the time alignment timer associated with the second component carrier may be similarly defined based upon the residual time during which the timing advance of the first component carrier will remain valid, thereby insuring that the timing advance of the second component carrier does not remain valid longer than the timing advance of the first component carrier upon which it is based. Thus, the time alignment timer for the timing advance of the second component carrier need not be set equal to the full value of the timer associated with the timing advance of the first component carrier. Instead, the time alignment timer may be set equal to the remaining time on the timer associated with the timing advance of the first component carrier during which the timing advance of the first component carrier will remain valid. As such, the timing advances of the first component carrier and the second component carrier will become invalid at the same time, absent an extension of the respective timing advances. By way of example, in an instance in which the timer associated with the timing advance of the first component carrier has a maximum or initial value of 10 ms, but has only 5 ms remaining at the time that the timing advance for the second component carrier is determined, the time alignment timer of the second component carrier may also be set equal to 5 ms such that the remaining term of the timers for both the first and second component carriers is the same. In terms of extending the timing advance, a mobile terminal, such as the processing circuitry, the processor, device interface or the like, may receive a timing advance command, such as via a MAC CE, for the secondary cell that indicates that the timer for the timing advance associated with the secondary cell should be reset to its full value, which may be the same as or different than the full value of the timer associated with the primary cell. In this embodiment, the cell index of the MAC CE may identify the secondary cell for which the timer of the validity of the timing advance is to be reset.

The method, apparatus and computer program product of an example embodiment therefore permit the determination of the timing advances of each of a plurality of component carriers to be triggered in response to certain predefined events that are indicative of an impending need for the timing advance to be determined. The method, apparatus and computer program product of one embodiment may therefore insure that the timing advances of the various component carriers that are needed for synchronization of uplink transmissions on the various component carriers to the base station 16 are available. Moreover, the method, apparatus and computer program product of example embodiments facilitate the determination of a timing advance for a second component carrier relative to the timing advance of a first component carrier, thereby avoiding issues associated with reliance upon RACH access to determine the various timing advances.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    determining that a predefined event has occurred;
    triggering a determination of a timing advance for a second component carrier relative to a timing advance of a first component carrier based upon occurrence of the predefined event, wherein the component carriers are concurrently allocated to a mobile terminal; and
    utilizing the timing advance for the second component carrier to synchronize communications on the second component carrier between the mobile terminal and a network, wherein
    the predefined event is at least one of receiving an activation command to activate the second component carrier, receiving signaling indicating an uplink grant reception, determining that a timing advance of the first component carrier has been adjusted, or determining that the timing advance for the second component carrier is determined by accessing a random access channel (RACH) such that the timing advance of the first component carrier may be determined based upon the timing advance of the second component carrier.

2. The method of claim 1, wherein
    the second component carrier is deactivated and predefined event is receiving the activation command to activate the second component carrier.

3. The method of claim 1, wherein
    the second component carrier lacks a valid timing advance, and
    the predefined event is receiving the signaling indicating the uplink grant reception.

4. The method of claim 1, wherein
    the predefined event is determining that the timing advance for the first component carrier has been adjusted.

5. The method of claim 1, wherein
    the first and second component carriers are primary and secondary component carriers, respectively, and
    the predefined event is determining that the timing advance of the secondary component carrier is determined by accessing the random access channel (RACH) such that the timing advance of the primary component carrier may be determined based upon the timing advance of the secondary component carrier.

6. The method of claim 1, further comprising:
    determining a time alignment timer that defines a time period during which the timing advance for the second component carrier will be valid by setting the time alignment timer equal to a residual time during which the timing advance of the first component carrier will remain valid.

7. An apparatus comprising processing circuitry configured at least to:
    determine that a predefined event has occurred;
    trigger a determination of a timing advance for a second component carrier relative to a timing advance of a first component carrier based upon occurrence of the predefined event, wherein the component carriers are concurrently allocated to a mobile terminal; and
    utilize the timing advance for the second component carrier to synchronize communications on the second component carrier between the mobile terminal and a network, wherein
    the predefined event is at least one of receiving an activation command to activate the second component carrier, receiving signaling indicating an uplink grant reception, determining that a timing advance of the first component carrier has been adjusted, or determining that the timing advance for the second component carrier is determined by accessing a random access channel (RACH) such that the timing advance of the first component carrier may be determined based upon the timing advance of the second component carrier.

8. The apparatus of claim 7, wherein
    the second component carrier is deactivated and the predefined event is receiving the activation command to activate the second component carrier.

9. The apparatus of claim 7, wherein
    the second component carrier lacks a valid timing advance, and
    the predefined event is receiving the signaling indicating the uplink grant reception.

10. The apparatus of claim 7, wherein
    the predefined event is determining that the timing advance for the first component carrier has been adjusted.

11. The apparatus of claim 7, wherein
    the first and second component carriers are primary and secondary component carriers, respectively, and
    the predefined event is determining that the timing advance of the secondary component carrier is determined by accessing the random access channel (RACH) such that the timing advance of the primary component carrier may be determined based upon the timing advance of the secondary component carrier.

12. The apparatus of claim 7, wherein
the processing circuitry is further configured to determine a time alignment timer that defines a time period during which the timing advance for the second component carrier will be valid by setting the time alignment timer equal to a residual time during which the timing advance of the first component carrier will remain valid.

13. At least one non-transitory computer-readable storage medium having computer-readable program instructions, the computer-readable program instructions comprising program instructions configured to:
determine that a predefined event has occurred;
trigger a determination of a timing advance for a second component carrier relative to a timing advance of a first component carrier based upon occurrence of the predefined event, wherein the component carriers are concurrently allocated to a mobile terminal; and
utilize the timing advance for the second component carrier to synchronize communications on the second component carrier between the mobile terminal and a network, wherein
the predefined event is at least one of receiving an activation command to activate the second component carrier, receiving signaling indicating an uplink grant reception, determining that a timing advance of the first component carrier has been adjusted, or determining that the timing advance for the second component carrier is determined by accessing a random access channel (RACH) such that the timing advance of the first component carrier may be determined based upon the timing advance of the second component carrier.

14. The at least one non-transitory computer-readable storage medium of claim 13, wherein
the second component carrier is deactivated and
the predefined event is receiving the activation command to activate the second component carrier.

15. The at least one non-transitory computer-readable storage medium of claim 13, wherein
the second component carrier lacks a valid timing advance, and
the predefined event is receiving the signaling indicating the uplink grant reception.

16. The at least one non-transitory computer-readable storage medium of claim 13, wherein
the predefined event is determining that the timing advance for the first component carrier has been adjusted.

17. The at least one non-transitory computer-readable storage medium of claim 13, wherein
the first and second component carriers are primary and secondary component carriers, respectively, and
the predefined event is determining that the timing advance of the secondary component carrier is determined by accessing the random access channel (RACH) such that the timing advance of the primary component carrier may be determined based upon the timing advance of the secondary component carrier.

18. The at least one non-transitory computer-readable storage medium of claim 13, wherein
the computer-readable program instructions further comprise program instructions configured to determine a time alignment timer that defines a time period during which the timing advance for the second component carrier will be valid by setting the time alignment timer equal to a residual time during which the timing advance of the first component carrier will remain valid.

\* \* \* \* \*